US006889039B2

(12) United States Patent
Osman

(10) Patent No.: US 6,889,039 B2
(45) Date of Patent: May 3, 2005

(54) MEMORY MANAGEMENT TERMINAL AND METHOD FOR HANDLING ACOUSTIC SAMPLES

(75) Inventor: Ashraf Osman, Holte (DK)

(73) Assignee: Nokia Mobile Phones Limited, Espoo (FI)

( * ) Notice: Subject to any disclaimer, the term of this patent is extended or adjusted under 35 U.S.C. 154(b) by 486 days.

(21) Appl. No.: 09/780,392

(22) Filed: Feb. 12, 2001

(65) Prior Publication Data

US 2001/0014600 A1 Aug. 16, 2001

(30) Foreign Application Priority Data

Feb. 11, 2000 (GB) .............................................. 0003242

(51) Int. Cl.$^7$ ............................................. H04M 11/00
(52) U.S. Cl. ............................... 455/412.1; 455/569.1; 704/270
(58) Field of Search .......................... 455/556.1, 569.1, 455/412.1, 563, 556.2, 550.1, 414.1; 370/313; 379/88.01, 88.08, 88.09, 88.28, 85, 88.17, 88.11, 88.27; 369/25.01, 29.02, 29.01; 704/270, 275; 386/125, 126

(56) References Cited

U.S. PATENT DOCUMENTS

| | | | | |
|---|---|---|---|---|
| 5,351,276 A | * | 9/1994 | Doll et al. ................ | 379/88.17 |
| 5,477,511 A | | 12/1995 | Englehardt | |
| 5,481,595 A | * | 1/1996 | Ohashi et al. ............ | 379/88.27 |
| 5,526,407 A | * | 6/1996 | Russell et al. ............ | 379/88.01 |
| 5,793,980 A | * | 8/1998 | Glaser et al. ................ | 709/231 |
| 5,812,870 A | * | 9/1998 | Kikinis et al. ................ | 712/32 |
| 5,875,448 A | * | 2/1999 | Boys et al. .................. | 715/531 |
| 5,903,871 A | * | 5/1999 | Terui et al. .................. | 704/500 |
| 5,914,941 A | | 6/1999 | Janky | |
| 5,915,238 A | | 6/1999 | Tjaden | |
| 6,029,063 A | * | 2/2000 | Parvulescu et al. ...... | 455/412.1 |
| 6,038,199 A | * | 3/2000 | Pawlowski et al. ...... | 369/29.02 |
| 6,243,594 B1 | * | 6/2001 | Silberfenig .............. | 455/556.1 |
| 6,470,076 B1 | * | 10/2002 | Iwami ........................ | 379/67.1 |
| 6,496,205 B1 | * | 12/2002 | White et al. ................ | 715/824 |
| 6,571,211 B1 | * | 5/2003 | Dwyer et al. ................ | 704/270 |
| 6,671,567 B1 | * | 12/2003 | Dwyer et al. .................. | 700/94 |

FOREIGN PATENT DOCUMENTS

| | | |
|---|---|---|
| EP | 0660249 A1 | 6/1995 |
| GB | 2340269 | 2/2000 |
| WO | 99/17235 | 4/1999 |

* cited by examiner

*Primary Examiner*—Charles Appiah
(74) *Attorney, Agent, or Firm*—Antonelli, Terry, Stout & Kraus, LLP

(57) ABSTRACT

A memory management terminal for handling recorded acoustic samples and generating an electronic representation of the acoustic sample for being represented in categories in a hierarchical memory structure, and including means in order to enable later retrieval of the acoustic samples, where the terminal has means for enabling each electronic representation of the acoustic sample to be assigned a category-label and that electronic representations with the same category-label can be played back together. The terminal includes: means for assigning each electronic representation of said acoustic sample with a category-label, means for recording the electronic representation of the acoustic sample, means for storing each category-labelled group of electronic representations, means for retrieving the electronic representations with a certain category-label, playback means and means for organising the electronic representations.

The claimed invention also includes a method for handling recorded acoustic samples and generating an electronic representation of the acoustic sample in order to enable later retrieval of the electronic representations.

14 Claims, 13 Drawing Sheets

MEMORY MANAGEMENT TERMINAL AND METHOD FOR HANDLING ACOUSTIC SAMPLES

BACKGROUND OF THE INVENTION

The invention relates to a memory management terminal for handling recorded acoustic samples and a method for handling recorded acoustic samples in a memory management terminal. The recorded acoustic samples can be e.g. voice memos used for recording short memos to be played back on a later occasion.

Voice recorders in general are earlier known like in U.S. Pat. No. 5,914,941, where a portable storage/playback apparatus is shown having means for recording audio programming digitally, storing memos and playing back the stored audio programming.

Motorola has in its new Tri-band phone L7089 something they call VoiceNotes, where notes could be recorded during normal calls, conference calls and standby. Up to 3 minutes of message could be recorded and every VoiceNote gets an individual tag.

Philips made a handheld PC, Velo 1, a couple of years ago, which could record voice memos. The voice memos could subsequently be moved as common files to different directories in order to be categorised.

SUMMARY OF THE INVENTION

An object of the invention is to provide a method of handling recorded acoustic samples, which enables an easy and quick retrieval of recorded memos.

According to claimed invention this objective is obtained by a method where a user can with use of a memory management terminal record an acoustic sample. The user can assign each acoustic sample with a label or category-label, a priority, a sorting criteria and a name. The method includes those acoustic samples with the same label or category-label can be represented on the display of a memory management terminal and can be re-sorted, played back or deleted. The handling of the recorded acoustic samples can be done by just using a keyboard of the memory management terminal, but also partly by using the voice commands.

An object of the invention is to provide a memory management terminal with a voice recorder of handling recorded acoustic samples, which enables an easy and quick retrieval of recorded acoustic samples.

According to the invention a memory management terminal obtains this objective having a voice recorder, where acoustic samples will be assigned a label or category-label and a sorting criteria after recording, and that acoustic samples with the same label or category-label are stored together in a hierarchical memory. It also includes that the acoustic samples with the same category-label can be represented on the display of the memory management terminal and that they can be re-sorted, played back or deleted. The handling of the acoustic samples can be done by just using the keyboard of the memory management terminal, but also partly by using the voice commands.

BRIEF DESCRIPTION OF THE DRAWINGS

The invention will be explained more fully below, by way of example, in connection with preferred embodiments and with reference to th drawing, in which.

DETAILED DESCRIPTION OF THE INVENTION

Figure 1:
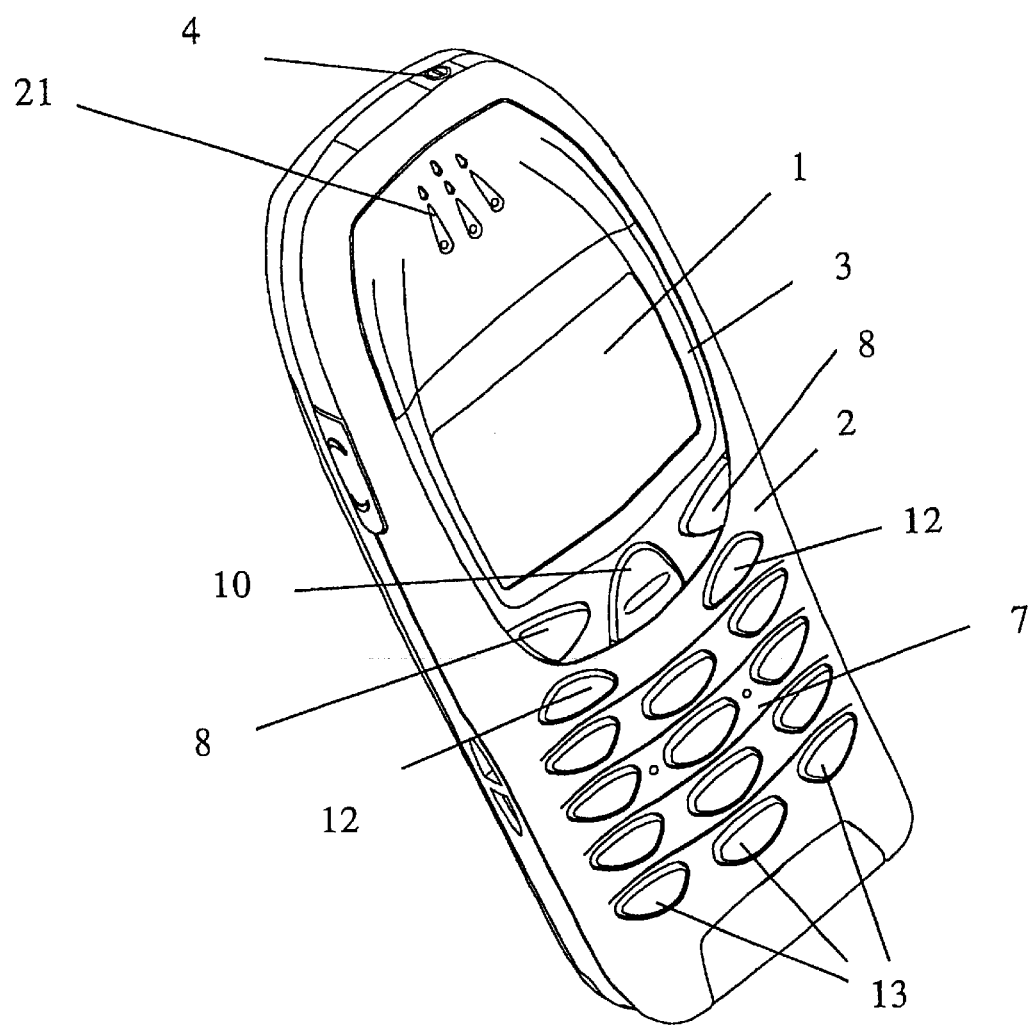
FIG. 1 shows in a perspective view a preferred embodiment of the memory management terminal according to the invention.

According to a first aspect the memory management terminal according to the invention will be described with reference to a hand portable phone, preferably a cellular/mobile phone. A preferred embodiment of this phone is shown in FIG. 1, where a phone is shown in perspective. As will be seen, the phone is provided with a front cover 2 having a window frame 3 encircling the protection window of the display assembly 1. The phone comprises a user interface having an on/off button 4, a keyboard/keypad 7, a battery, a display/LCD 1, an ear-piece 21 and a microphone.

The keypad 7 has a first group of keys 13 as alphanumeric keys, by means of which the user can enter a telephone number, write a text message (SMS), write a name (associated with the phone number), etc. Each of the twelve alphanumeric keys 13 is provided with a Figure "0–9" or a sign "#" or "*", respectively. In alpha mode each key is associated with a number of letters and special signs used in the text editing.

The keypad 2 additionally comprises two soft keys 8, two call handling keys 12, and a navigation key 10. The functionality of the soft key depends on the state of the phone and the navigation in the menu by using a navigation key. The present functionality of the soft keys 8 is shown in separate fields in the display 1 just above the keys 8. The two call handling keys 12 are used for establishing a call or a conference call, terminating a call or rejecting an incoming call.

The navigation key 10 is an up/down key and is placed centrally on the front surface of the phone between the display 3 and the group of alphanumeric keys 8. Hereby the user will be able to control this key with his thumb. This is the best site to place an input key requiring precise motor movements. Many experienced phone users are used to one-hand handling. They place the phone in the hand between the fingertips and the palm of the hand. Hereby the thumb is free for inputting information.

Figure 2:
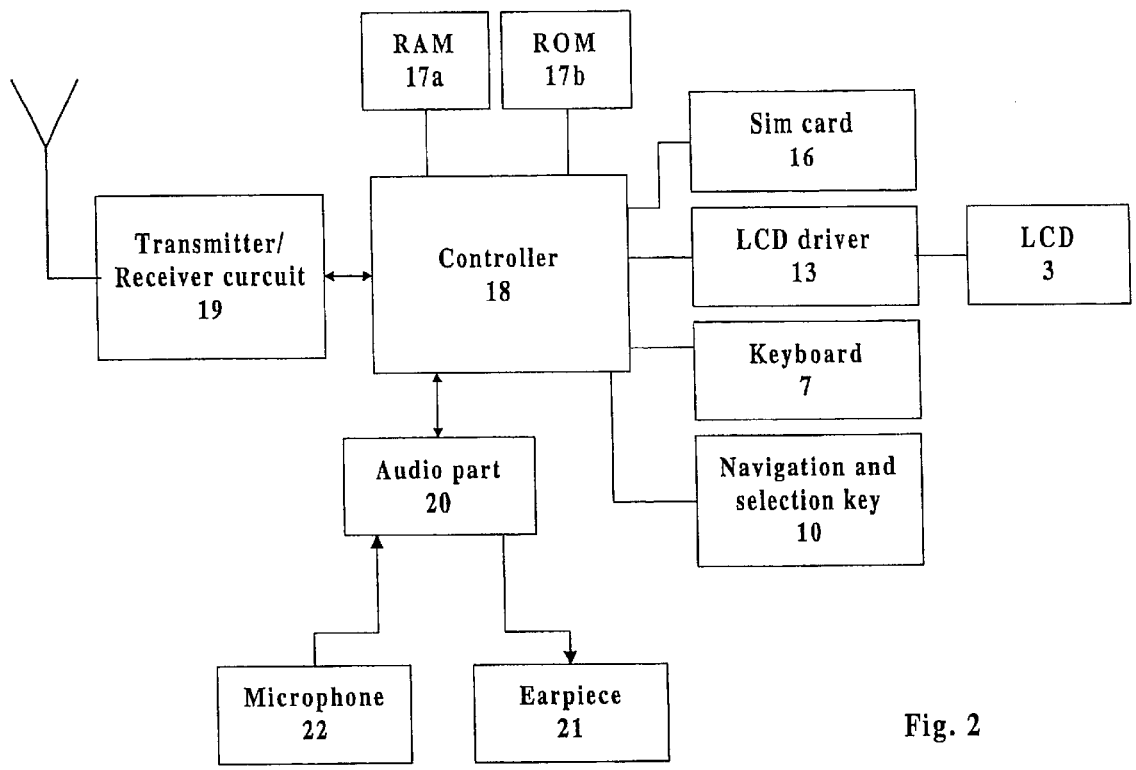
FIG. 2 schematically shows the essential parts of a telephone for communication with a cellular network.

FIG. 2 schematically shows the most important parts of a preferred embodiment of the phone, said parts being essential to the understanding of the invention. The microphone 22 records the user's speech, and the analogue signals formed thereby are A/D converted in an A/D converter (not shown) before the speech is encoded in an audio part 20. The encoded speech signal is transferred to the controller 18 (physical layer processor), which e.g. supports the GSM terminal software. The controller 18 also forms the interface to the peripheral units of the apparatus, including RAM and ROM memories 17a and 17b, a SIM card 16, the display 1 and the keypad 7(from FIG. 1) as well as data, power supply, etc. The controller 18 communicates with the transmitter/receiver circuit 19. The audio part 20 speech-decodes the signal, which is transferred from the controller 18 to the ear-piece 21 via a D/A converter (not shown).

The preferred embodiment of the phone of the invention is adapted for use in connection with the GSM network, but, of course, the invention may also be applied in connection with other phone networks. It could be cellular networks, various forms of cordless phone systems or in dual band phones accessing sets of these systems/networks.

The controller 18 is connected to the user interface. Thus, it is the controller 18, which monitors the activity in the phone and controls the display 1 in response thereto.

Therefore, it is the controller 18, which detects the occurrence of a state change event and changes the state of the phone and thus the display text. The user may cause a state change event, when he activates the keypad 7 including the navigation key or keys 10, and these type of events are called entry events or user events. However, the network communicating with the phone may also cause a state change event. These type of events and other events beyond the user's control are called non-user events. Non user events comprise status change during call set-up, change in battery voltage, change in antenna conditions, message on reception of SMS, etc.

The invention will be described with reference to FIGS. 3 to 8 showing the various features and steps of handling of acoustic samples. In the description the invention will be exemplified with voice memos as acoustic samples, where the acoustic samples are converted to an electronic representation of the acoustic samples. This electronic representation is a MIDI-file, MP3-file or any other similar file-type for an electronic representation of an acoustic sample. There will also be acoustic samples recorded used as voice tags for labels or category-labels, which are also naturally converted to MIDI-files or similar.

Figure 3:
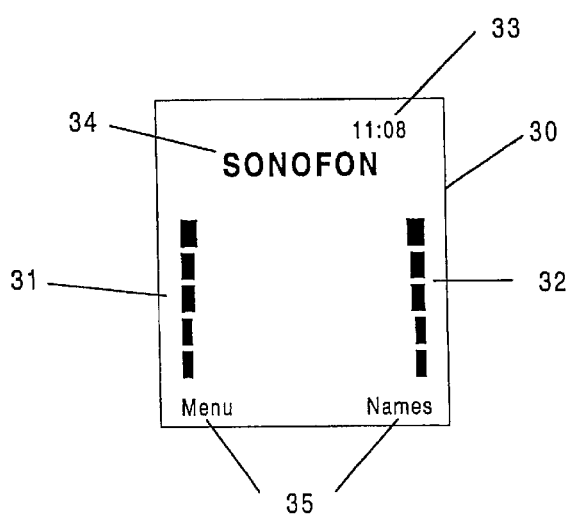
FIG. 3 shows an idle mode display for the phone.

The starting point is that the phone is in idle mode, which means that the phone is turned on and ready to be used for any possible operation. An idle mode display 30 for the phone 1 is shown in FIG. 3, which includes two bars indicating the signal strength 31 and the battery level 32. Furthermore there is a time indication 33, an identification 34 of the operator to which the phone is presently connected, and two labels 35 indicating the present functionality (Menu: access to the Menu structure; Names: access to the Phone book) of the two soft keys 8.

In idle mode the user can with a voice command, "Memo" start the voice memo function. The voice memo function can also be selected with menu selection by pressing the left soft key 8 "Menu" (shown in FIG. 3) and scroll down with the navigation keys 10 until display 1 indicates "Voice Memo", like in display 40 in FIG. 4b. This display will include a header 41 indicating the mode of the display, "Voice Memo". By pressing the left soft key 8, "Select", once more when the display 40 "Voice Memo" is shown, the voice memo-function is activated, and display 42, indicating "Record" is shown. If instead "Exit", which is also indicated in the display is executed by pressing the right soft key 8, the phone is brought back to idle mode (idle mode display 30), FIG. 3.

Figure 4A:
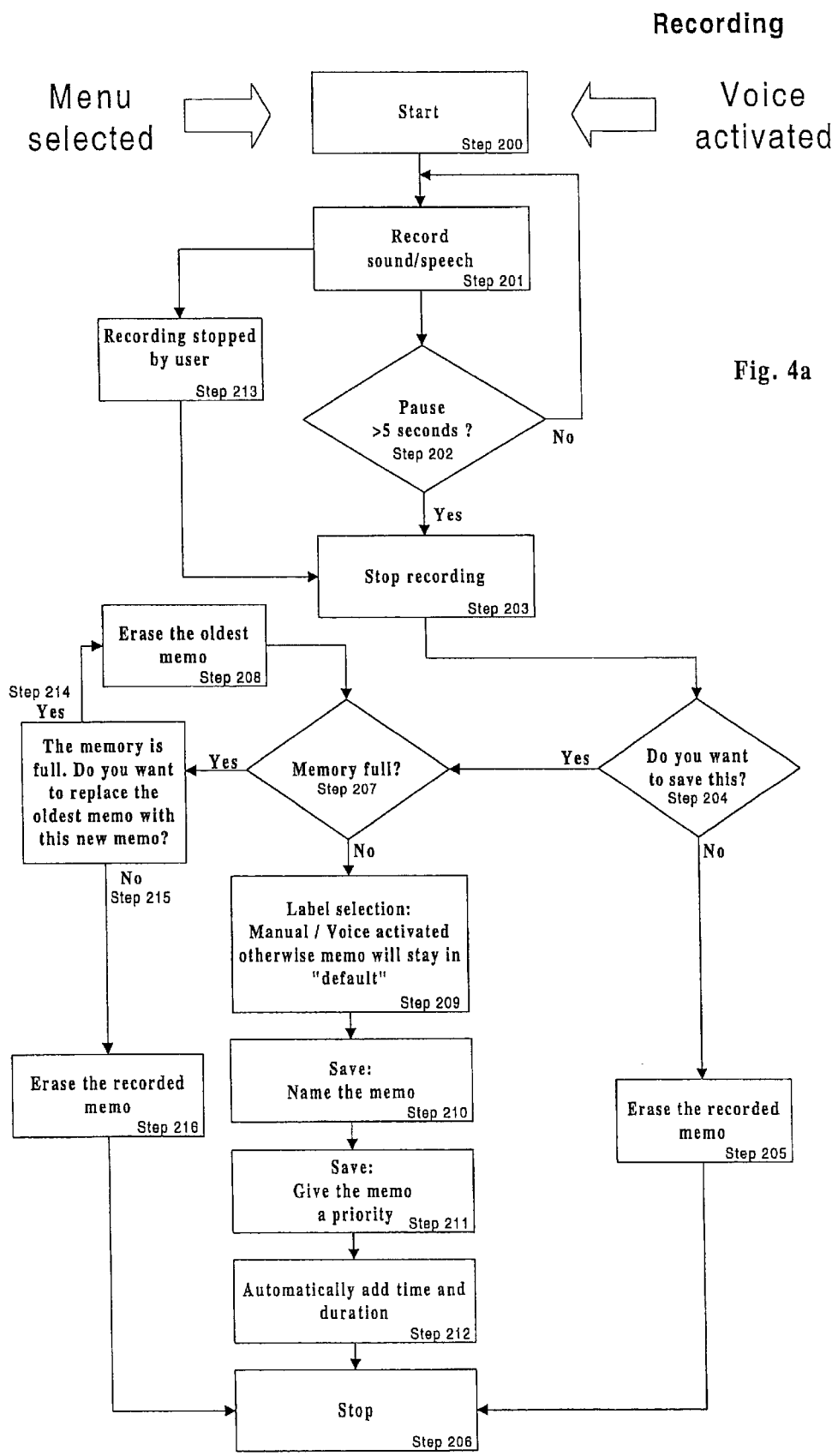
FIG. 4a shows a flow chart of the handling for recording memos according to the invention.
Figure 4B:
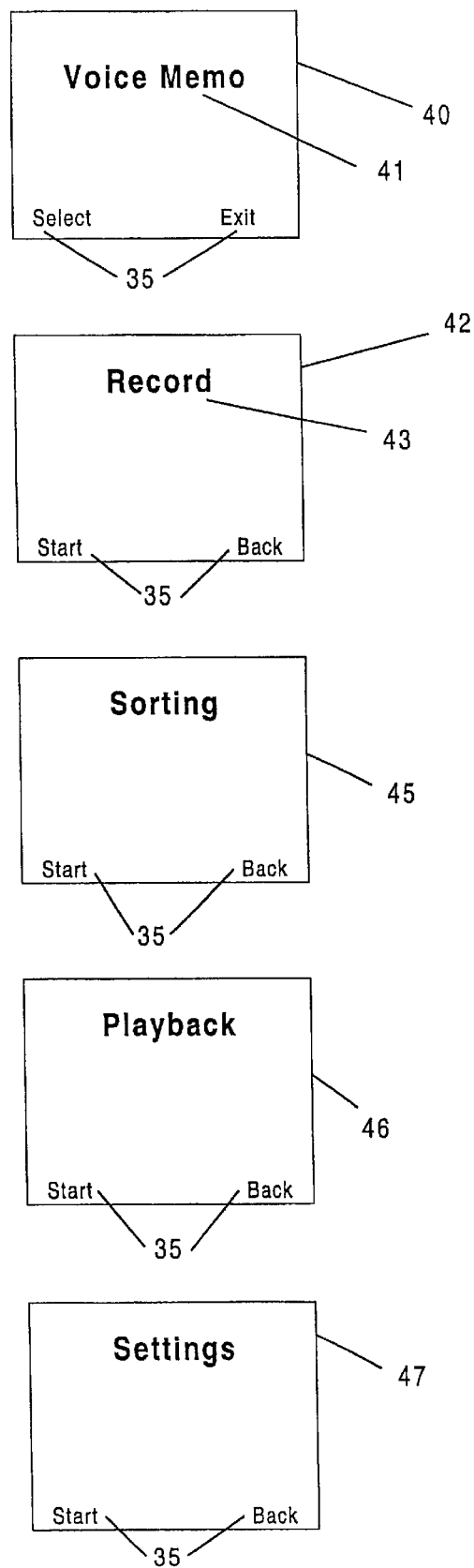
FIG. 4b shows different windows of the phone display in the voice memo function according to the invention.
Figure 4C:
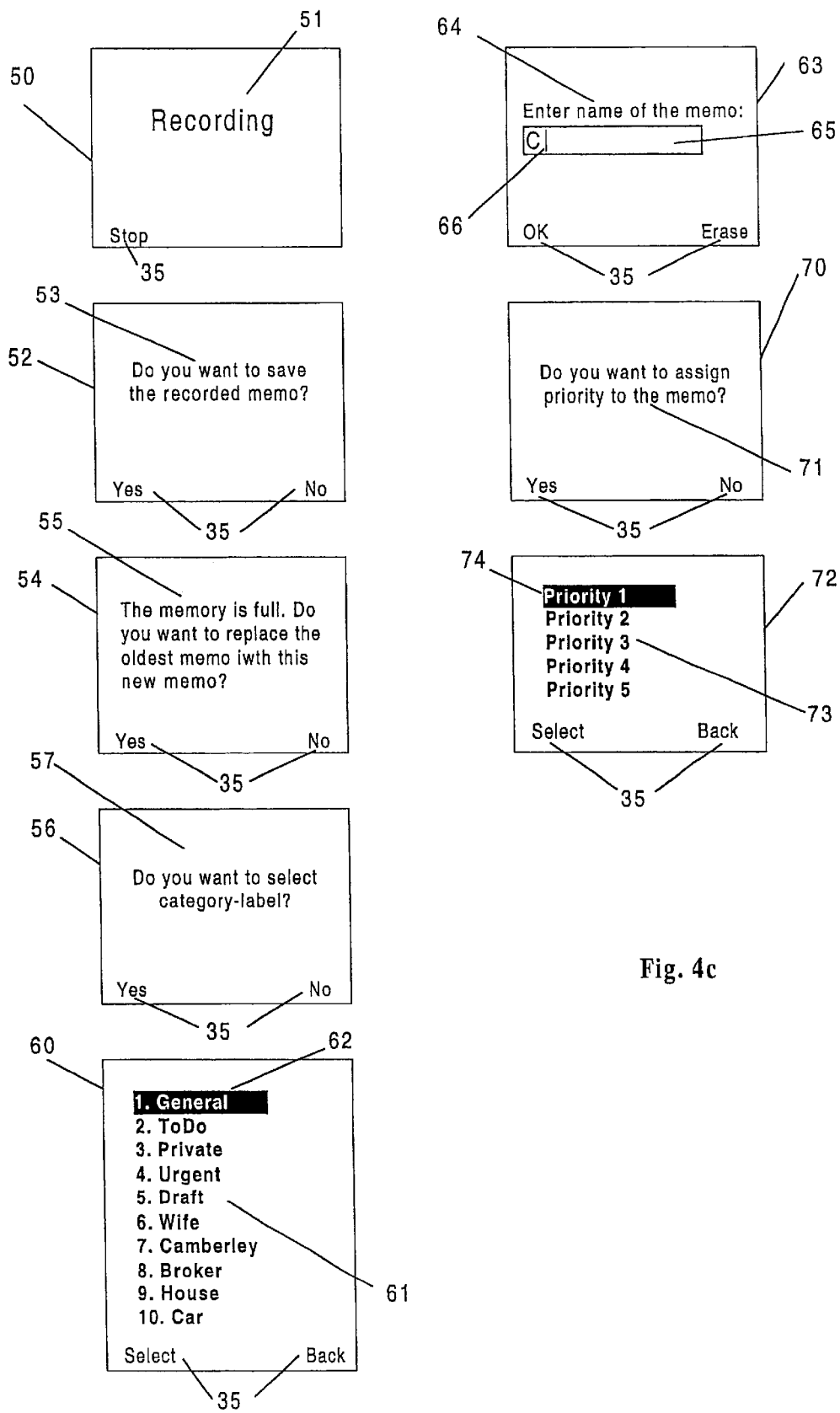
FIG. 4c shows different windows of the phone display in the voice recording function according to the invention.
Figure 5A:
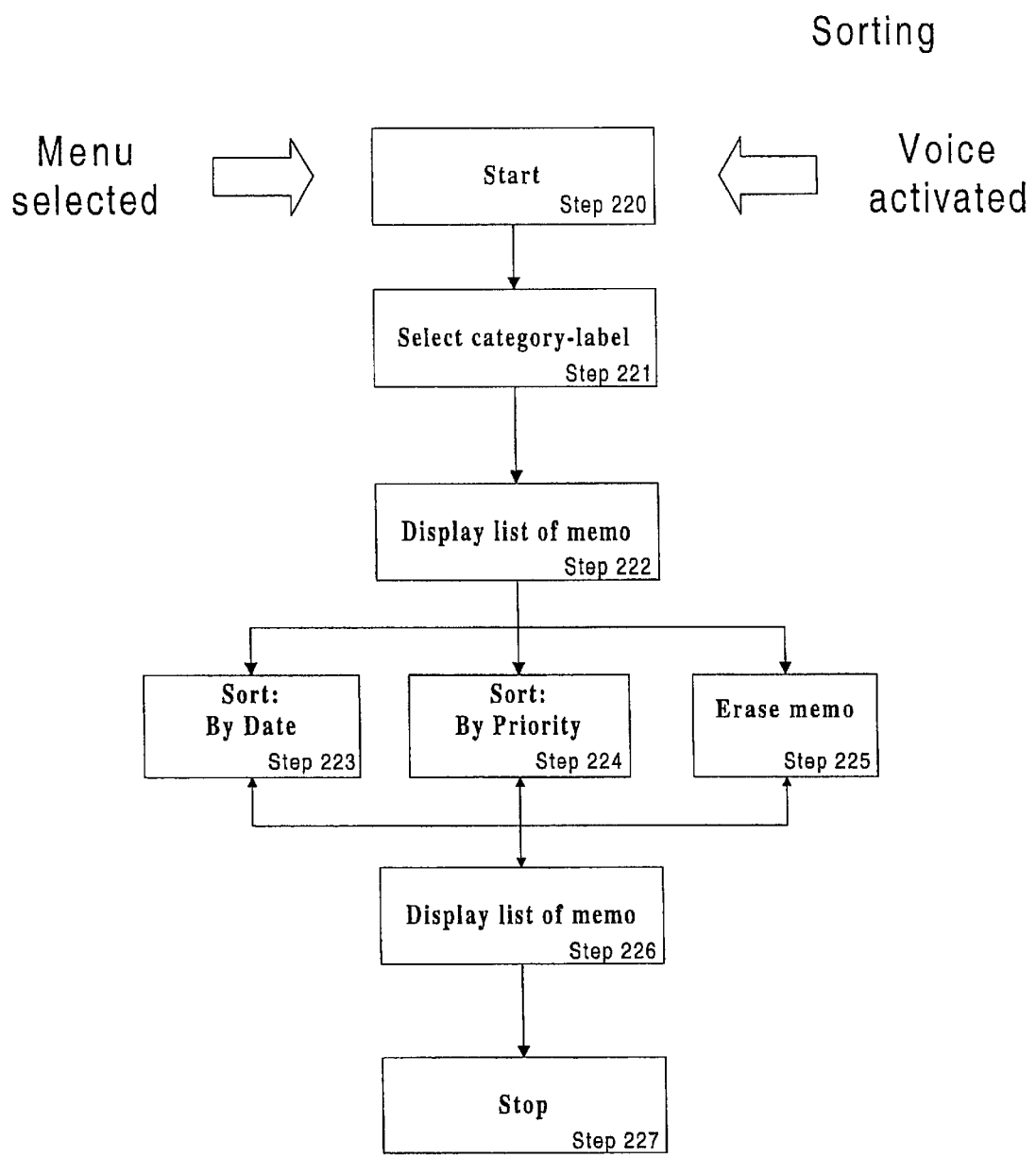
FIG. 5a shows a flow chart of the handling for sorting memos according to the invention.
Figure 5B:
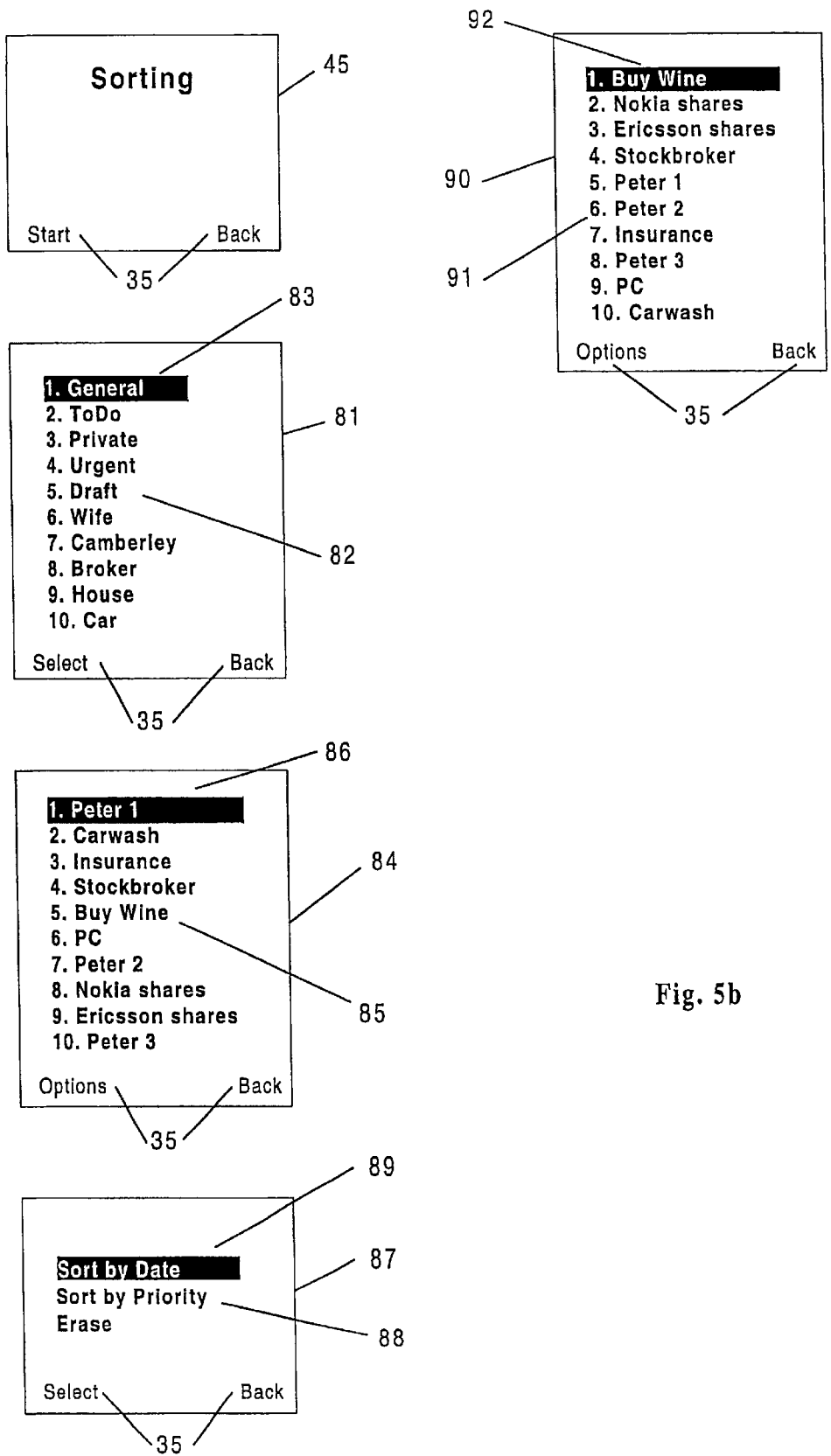
FIG. 5b shows different windows of the phone display in the sorting function according to the invention.

With the voice command the phone will automatically change to the display 42, shown in FIG. 4b, which is the "Record"-display. This display will include a header 43 indicating the mode of the display, "Record". This display also indicates with the two labels 35 the present functionality of the two soft keys 8. The function "Start", which starts the function in the present display (42, 45, 46 or 47), is executed if pressing the left soft key 8. By pressing the up/down navigation key 10 the other possible functions; "Sorting" (display 45), "Playback" (display 46) and "Settings" (display 47), will be accessible and shown on the display instead of "Record". The display also indicates "Back", which is executed by the right soft key 8 and will bring the phone back to "Voice Memo" mode (Voice Memo mode display 40).

When the user selects the "Select" operation from the "Record" display either by pressing the left soft key 8 or using a voice command "Record", "Recording" display 50 will appear. The phone prepares recording of a voice memo, step 200 in FIG. 4a, thereafter starts the recording of a voice memo, step 201, and simultaneously an electronic representation of the voice memo is created. Display 50 includes a header 51, "Recording", and the label 35 indicates the present functionality of the left soft key 8. By pressing the left "Stop" soft key 8 the user has a possibility to stop the present recording. If the left "Stop" is pressed and the recording, step 201, is stopped, step 213, jumps the phone to display 52. While recording, step 201, the processor 18 will check, step 202, if there is a pause in the recording, which is longer than five seconds. If there is a pause longer than five seconds the recording is stopped, step 203, otherwise the recording continues. If the recording is stopped, step 203, a display 52 will appear with a header 53 "Do you want to save the recorded memo".

In display 52 the user is asked to decide if he/she wants to save the recorded memo or not, step 204. There could always be a need to redo the recording once more. The display 52 also includes the two labels 35, which indicates the present functionality (Yes: Initiate saving of the memo; No: ignore the memo recorded and jump back to display 42) of the two soft keys 8. When pressing the right "No" soft key 8 the recorded memo will be erased, step 205, and the phone is brought back, step 206, to display 42. In display 42 a new memo can be recorded or one of the other functions, "Sorting", "Playback" or "Settings" can be displayed and selected by scrolling between displays 42, 45, 46 and 47 with the navigation keys 10. By pressing the left "Yes" soft key 8, the processor 18 checks if the memory has available space for the memo or not, step 207. If the memory is full a display 54 appears showing a header, "The memory is full. Do you want to replace the oldest recorded memo with this new memo?" and the two labels 35. The label 35 indicates the present functionality (Yes: Erase the oldest recorded memo; No: ignore the memo recorded and jump back to display 42) of the two soft keys 8. When pressing the right "No" soft key 8, step 215, the recorded memo will be erased, step 216, and the phone is brought back, step 206, to the "Record"-display 42, where a new memo can be recorded or one of the other functions, "Sorting", "Playback" or "Settings" can be displayed by scrolling between displays 42, 45, 46 and 47 with the navigation keys 10. By pressing the left "Yes" soft key 8, step 214, in display 54 the oldest recorded memo is erased, step 208, and the processor 18 checks again if there is enough space in the memory for memo, step 207. If there is not enough space the display 54 will appear again and this process will continue until there is enough space to save the memo.

After the processor has checked the memory, step 207, and finally finds out that there is enough space to save the memo, a display 56 will appear having a header 57 saying, "Do you want to select category-label?". Display 56 also includes the two labels 35, which indicates the present functionality (Yes: Initiate selection of category-label; No: assign the memo a default category-label) of the two soft keys 8. When pressing the right "No" soft key 8 the recorded memo will be assigned a default category-label, "default", step 209. How this default category-label is defined will be described in connection with the description of the setting function. If the user instead presses the left "Yes" soft key 8, a display 60 will appear indicating a list 61 with the different possible/available category-labels. The display 60 appears to be of another size compared with previous shown displays, but this is not the case. However is the list 61 of category-labels can be longer than the available space in display 60, so just to show the whole list 61 this display 60 is shown including the whole list 61. The user of the phone uses the navigation keys 10 to scroll up or down to see the whole list 61. This display 60 also includes the two labels 35, which indicates the present functionality (Select: The highlighted category-label is selected; Back: jump back to the previous menu level) of the two soft keys 8. By pressing the right "Back" soft key 8 it returns to the previous display 56. In the list 61 a category-label 64 will be highlighted to indicate, which category-label that will be assigned to the recorded memo by pressing the left "Select" soft key 8, step 209. Selection can also be made with voice command. The user just says the name of the category-label and the processor 18 will compare the said category-label with the saved voice tags for each category-label, whereafter the selected category-label will be assigned to the memo. How the voice tag is connected to the category-label will be explained later when describing how to amend the list of category-labels.

After the selection of category-labels is executed, display 63 appears including a header 64 "Enter name of the memo:" and a text field 65. In the text field 65 letters may be entered using the alphanumeric keys 13. The labels 35 indicate the present functionality (OK: Finished entering the name, continue to next menu; Back/Erase: Erase the last entered letter or if no letters have entered jumps the phone to a previous display) of the two soft keys 8. A cursor 66 in the text field 65 indicates the position of the next letter to be entered. The navigation keys 10 control the position of the cursor 66, and scroll the cursor 66 left or right in the text field 65. When pressing the right "Erase" soft key 8 the last entered letter in the text field 65 will be erased or if the cursor 66 is placed in any other place the letter placed left of the cursor 66 will be erased. If no letters have been entered in the text field 65 the right label 35 will indicate "Back" instead of "Erase", and the phone jumps back to display 124 if the right "Back" soft key 8 is pressed. By pressing the left "OK" soft key 8 the memo will be named, step 210, the name that has been entered in the text field 65.

After the naming, step 210, a display 70 appears having a header 71, "Do you want to assign a priority to the memo?". This display also includes the two labels 35 indicating the present functionality (Yes: jump to next menu to assign a preferred priority to the memo; No: assign a default priority to the memo) of the two soft keys 8. When pressing the right "No" soft key 8 the memo will be assigned a default priority, "Priority 3", step 211. Date/time and duration of the memo will be automatically attached to memo and saved together with the memo, step 212. The record function is thereby ended, step 206, and the phone is brought back to display 42, where a new memo can be recorded or one of the other functions, "Sorting", "Playback" or "Settings" can be displayed by scrolling between displays 42, 45, 46 and 47 with the navigation keys 10.

If instead the left "Yes" soft key 8 is pressed in display 70, a display 72 will appear indicating a list 73 with the different possible priorities ("Priority 1", "Priority 2", "Priority 3", "Priority 4" and "Priority 5"). Naturally, there could be another number of priorities or another way of showing the priority, e.g. "Priority A", "Priority B", "Priority C", etc. Display 72 also includes the two labels 35, which indicates the present functionality (Select: The memo will be assigned the selected priority; Back: jump back to the previous menu level) of the two soft keys 8. The user of the phone uses the navigation keys 10 to scroll up or down in the list 73 to select the desired priority. By pressing the right "Back" soft key 8 it returns to the previous display 70. In the list 73 a priority 74 is highlighted to indicate, which priority that will be assigned to the recorded memo by pressing the left "Select" soft key 8, step 211. After the memo has been assigned a priority, step 211, time and duration of the memo will be automatically attached to memo and saved together with the memo, step 212. The record function is thereby ended, step 206, and the phone jumps back to display 42, where a new memo can be recorded or one of the other functions, "Sorting", "Playback" or "Settings" can be displayed by scrolling between displays 42, 45, 46 and 47 with the navigation keys 10. In display 63 a voice command "READY" can also be used quit naming the memo and giving it a priority, step 211, and instead automatically save time and duration of the memo together with the memo in the memory, step 212, whereafter the recording is ended, step 206, like described above. The sorting feature shown in FIGS. 5a and 5b will now be described in more detail showing an embodiment of the invention. When the user selects the "Start" operation, step 220, from the "Sorting" display 45, either by pressing the left "Start" soft key 8 or using a voice command "Sorting", display 81 will appear and the phone prepares sorting of memos by displaying a list 82 of the different category-labels. The list 82 includes the different possible category-labels ("General", "ToDo", "Private", "Urgent" and "Draft", etc.). Display 81 also includes the two labels 35 indicating the present functionality, (Select: The memos with the selected category-label assigned will be sorted; Back: jump back to the previous menu level) of the two soft keys 8. The user of the phone uses the navigation keys 10 to scroll up or down in the list 82. By pressing the right "Back" soft key 8 it returns the phone to the previous display 45. In the list 82 a category-label 83 is highlighted to indicate, which category-label will be selected by pressing the left "Select" soft key 8, step 221. When the left "Select" soft key 8 is pressed, the processor 18 will retrieve all memos with that category-label 83. A display 84 will appear including a list 85 with all those memos, step 222. The default order of the list 85 is that the newest recorded memo is at the top of the list 85.

In display 84, the display is also indicated with the two labels 35 the present functionality, (Options: jumping a selection menu for further sorting of the memos; Back: jump back to the previous menu level) of the two soft keys 8. The user of the phone uses the navigation keys 10 to scroll up or down in the list 85. By pressing the right "Back" soft key 8 it returns to the previous display 81. In the list 85 a memo 86 is highlighted to indicate, which memo will be selected by pressing the left "Options" soft key 8. If the left "Options" soft key 8 is pressed a display 87 will appear indicating a list 88 with the different available options of how to handle the list or the highlighted memo 86. The available options are as shown in display 87: "Sort by Date", "Sort by Priority" and "Erase", step 223–225. Naturally, there could be other options like e.g. "Play" or "Rename". The user of the phone uses the navigation keys 10 to scroll up or down in the list 88 in order to select the required feature.

The features "Sort by Date" and "Sort by Priority", which are shown in the list 88, affects all the memos shown in display 84. The memos in the list 88 are affected in that the individual place of the each memo in the list can be changed according to any of the sorting criteria, "Sorting by Date" or "Sorting by Priority". A sorted list 91 is shown in display 90. The different options in display 87 are selected with the two soft keys 8. When the right "Back" soft key 8 is pressed it jumps the phone to the previous display 84, and a new choice is available. Also indicated with two labels 35 in display 87 is the present functionality of the soft keys 8. If the left "Select" soft key 8 is pressed the processor 18 executes the selected option, step 223, 224 or 225 (in this display they are: "Sorting by Date", "Sorting by Priority" or Erase) indicated with highlighted option 89. A display 90 appears, step 226, where a sorted list 91 shown with the memos sorted according to the selected option 89. If the option "Erase", step 223, was selected the corresponding erased memo will not appear in the list 91 after executed sorting. In display 90 is also indicated with the two labels 35 the present functionality, (Options: jumping to the selection menu for further sorting of the memos; Back: jump back to the previous menu level, display 81) of the two soft keys 8. When the right "Back" soft key 8 is pressed the phone jumps to the display 81 and another category-label can be selected from the list 82 to be sorted or if the right "Back" soft key 8 in display 81 is pressed again the phone jumps to display 45, step 227. In this display the different options "Record", "Sorting", Playback" and "Settings" are available by scrolling between displays 42, 45, 46 and 47 with the navigation keys 10. If the left "Select" soft key 8 is pressed in display 84, display 87 will appear and further sorting of the memos with the present category-label is possible.

The displays 81, 84 and 90 appear to be of another size compared with previous shown displays, but this is not the case. However the lists 82, 85 and 91 of category-labels and memos could be longer than the available space in displays. To enhance the understanding displays 81, 84 and 90 are shown here including the whole lists 82, 85 and 91, and thereby have the displays 81, 84 and 90 are not the actual size.

Figure 6A:
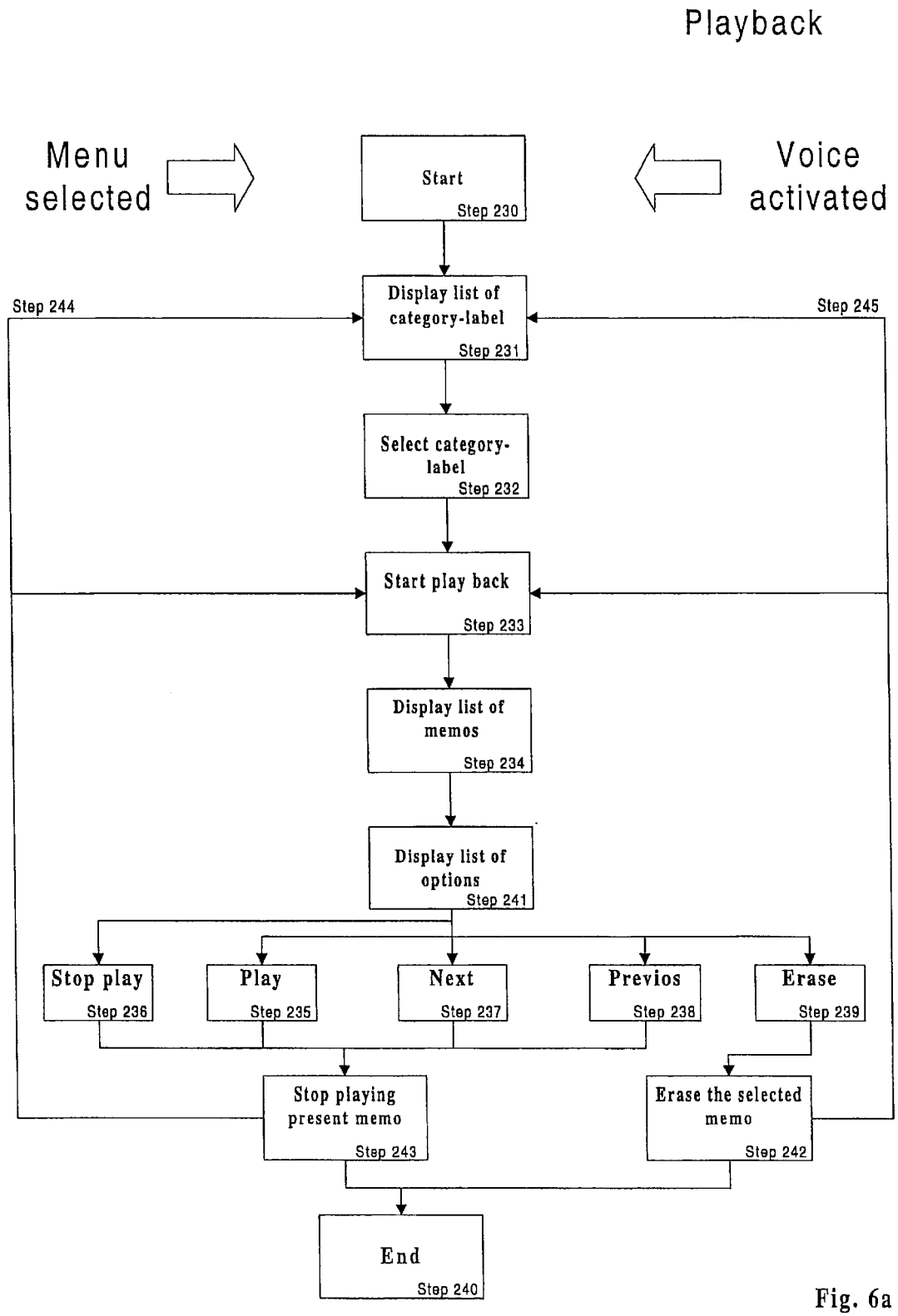
FIG. 6a shows a flow chart of the handling for playback of the memos according to the invention.
Figure 6B:
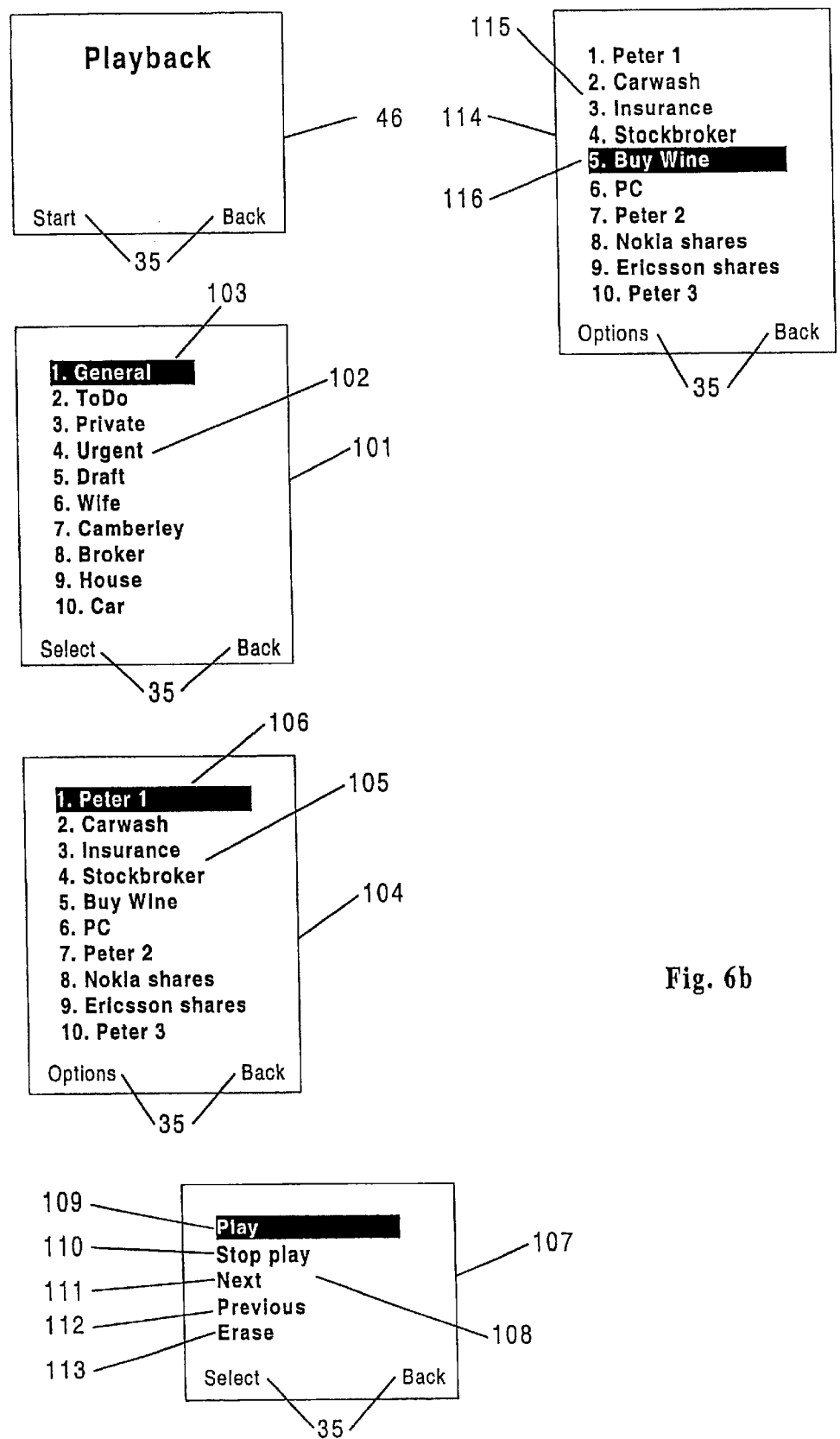
FIG. 6b shows different windows of the phone display in the playback function according to the invention.

The playback feature shown in FIGS. 6a and 6b will now be described in more detail showing an embodiment of the invention. When the user selects the "Start" operation, step 230, from the "Playback", display 46, either by pressing the left "Start" soft key 8 or using a voice command "Playback", display 101 will appear, step 231. The phone prepares playback of memos, step 230, display 101 indicates a list 102 with the different possible category-labels ("General", "ToDo", "Private", "Urgent" and "Draft", etc.). This display also include the two labels 35 indicating the present functionality, (Select: Selects the category-label from which memos to be played back and a list with all the memos with that category-label will be displayed; Back: jump back to the previous menu level) of the two soft keys 8. The user of the phone uses the navigation keys 10 to scroll up or down in the list 102. By pressing the right "Back" soft key 8 it returns to the previous display 46 and the playback function is ended, step 241, where a new memo can be recorded or one of the other functions, "Record", "Sorting" or "Settings" can be displayed by scrolling between displays 42, 45, 46 and 47 with the navigation keys 10.

In the list 102 a category-label 103 is highlighted to indicate, which category-label will be selected by pressing the left "Select" soft key 8, step 232. When the left "Select" soft key 8 is pressed, the processor 18 will retrieve all memos with that highlighted category-label 103 and a list 105 with all those memos will appear in a display 104, step 234. The first memo in list 105 will automatically start to be played back, step 233. Normally the first memo in the list 105 is the oldest memo, but if the list of memos have been sorted in the sorting function the list could have another order. If there are not any memos assigned with the selected category-label 103 the phone will return to display 101.

In display 104, the display is indicated with two labels 35 the present functionality, (Options: A selection menu will appear with different options; Back: jump back to a previous menu level) of the two soft keys 8. The user of the phone uses the navigation keys 10 to scroll up or down in the list 105. By pressing the right "Back" soft key 8 the phone stops the playback and jumps to display 101, step 240. In the list 105 a memo 106 is highlighted to indicate, which memo will be selected by pressing the left "Options" soft key 8. If the left "Options" soft key 8 is pressed a display 107 will appear, step 241, indicating with a list 108 the different available options of how to handle the selected memo 106 or other options, step 241. The available options are as shown in display 107: "Play" (Step 235), "Stop play" (Step 236), "Next" (Step 237), "Previous" (Step 238) and "Erase" (239). Naturally, there could be other options. The user of the phone uses the navigation keys 10 to scroll up or down in the list 108 in order to select the required feature. Before the selection is made the earlier played back memo will still play if the phone has not finished the playback of that memo. When playback of a memo has been finished and no selection has been made in the display 107 or if the left "Options" soft key 8 has not been pressed in display 104, the phone will start to play the next memo in the list 105. If it was the last memo that was played the phone will jump to display 101.

The selections in display 107 are made by pressing the left "Select" soft key 8, and the highlighted option will be executed (Step 235–239). By pressing the right "Back" soft key 8 instead the playback will be stopped, step 236, and the phone jumps back to display 101.

If the feature 109, "Play", is selected, step 235, the phone will stop playing the present memo, step 243, and start to play the selected memo, step 233. A display 114 will appear, step 234, where selected memo 116, which is played back, is highlighted in a list 115. If the feature 110, "Stop play", is selected, step 236, the phone stop playing the present memo, step 243, and the display 101 will appear, step 231. When the feature 111, "Next", is selected, step 237, the phone will stop playing the present memo, step 243, and start to playback, step 233, the next memo in the list 105. The display 114 appears, step 234, indicating the played memo 116 in the list 115. If there are no more memos in the list 105 or 116 the phone will jump to display 231, step 244. When the feature 112, "Previous", is selected, step 238, the phone will stop playing the present memo, step 243, and start to playback, step 233, the previous memo in the list 105. The display 114 appears, step 234, indicating the played memo 116 in the list 115. If it was the first memo in the list 105 or 116 that was played back the phone jumps to display 231, step 244. When the feature 113, "Erase", is selected, step 239, the selected memo will be erased, step 242. The display 114 will appear, step 234, where the memo, which was before the erased memo in list 104 is highlighted in the list 115. Display 114 has the same features like display 104, so that display 107 will appear if the left "Options" soft key 8 is pressed and the above options are available. If it was the last memo in the list 105 or 116 that was erased and that memo was played back when erased, step 242, the phone will jump to display 101, step 245.

The "Playback" function will continue until it is ended, step 240, which is done by pressing the right "Back" soft key 8 once or twice in display 101, 104, 107 and 114, and the phone jumps back to display 46. In the display the "Playback" function could be started again or one of the other functions, "Record", "Sorting" or "Settings" can be displayed, and later started, by scrolling between displays 42, 45, 46 and 47 with the navigation keys 10.

The user can also after having used the voice command "Playback" to start the playback function continue to use voice commands. As earlier described the phone will show a display 101, after having used the voice command "Playback", and that display 101 includes a list 102 with the different possible category-labels to be played back. The user can easily choose one of the category-labels to playback by saying the name of the required category-label. The phone will then jump to display 104 and start to playback the first voice memo on the list 105. After the first memo has been played back the phone will continue with the next memo on the list 105, and continue to take next memo on the list 105 when an earlier memo is finished. The playback of the memos will continue until all the memos have been played back or stopped earlier with the soft keys 8 as earlier described. If all memos are played back without interrupting them the phone will, after having finished the playing back of the last memo, jump to display 101, where a new selection of category-label can be made.

The displays 101, 104 and 113 appear to be of another size compared with previously shown displays, but this is not the case. However the lists 102, 105 and 115 of category-labels respectively memos could be longer than the available space in displays. To enhance the understanding displays 101, 104 and 113 are shown here including the whole lists 102, 105 and 115, and thereby have the displays 101, 104 and 113 are not the actual size.

In display 104 and 114 memos that have not been played back can be indicated so that the user can distinguish the memos played back from the memos not played back. This can be done by having the non-played back indicated in Italics (not shown in fig.). After the memo has been played back the name of the memo will change from italic to normal style.

Figure 7A:
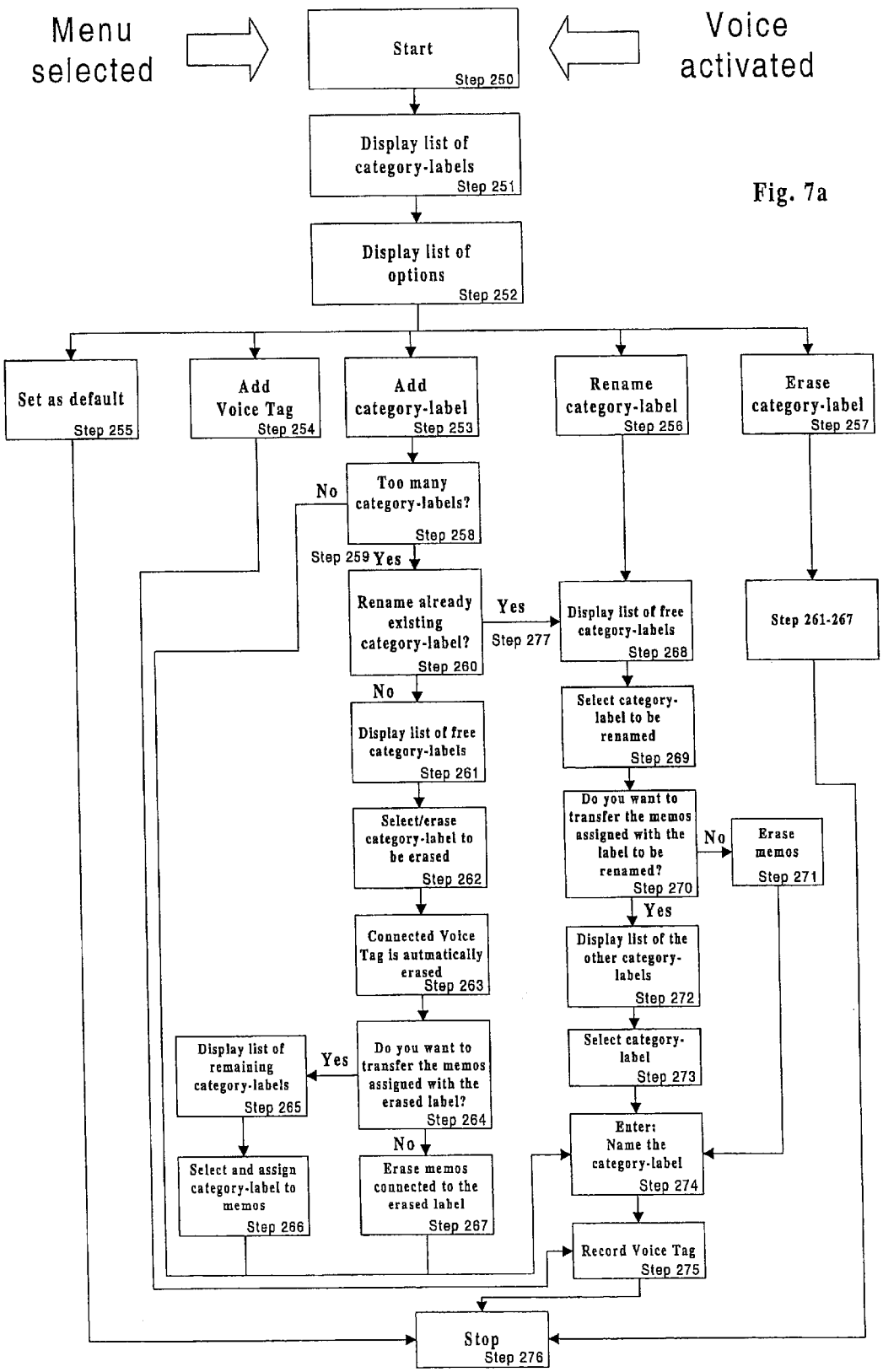
FIG. 7a shows a flow chart of the handling for changing settings of the voice recorder function according to the invention.
Figure 7B:
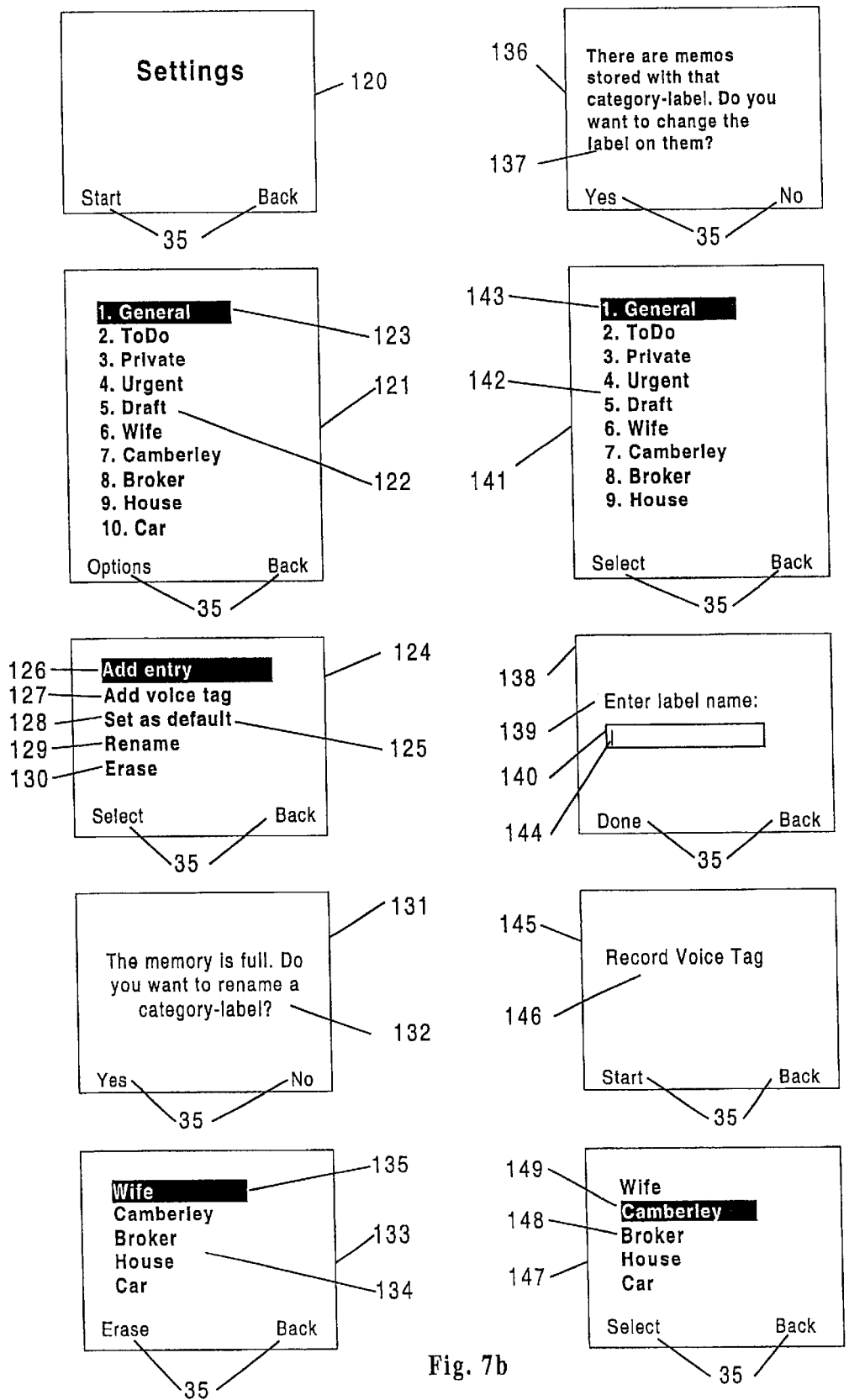
FIG. 7b shows different windows of the phone display in the settings function according to the invention.
Figure 7C:
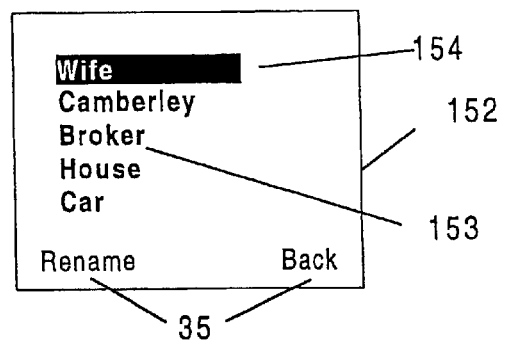
FIG. 7c shows different windows of the phone display in the settings function according to the invention.
Figure 7C:
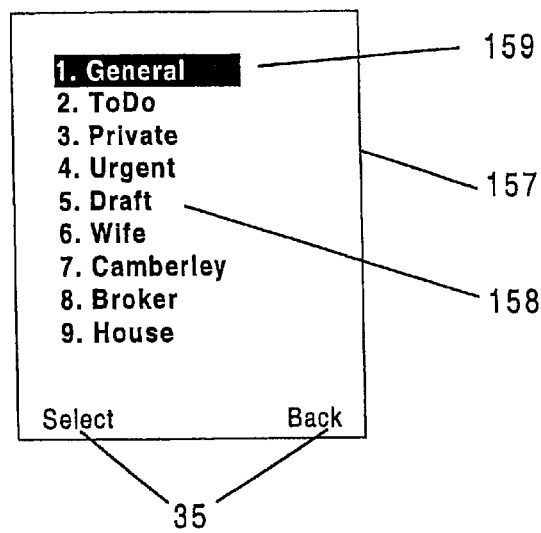

The setting feature shown in FIGS. 7a, 7b and 7c will now be described in more detail showing an embodiment of the invention. When the user selects the "Start" operation, step 250, from the "Settings" display 120, either by pressing the left "Start" soft key 8 or using a voice command "Settings", the phone prepares changing the settings and display 121 will appear, step 251. Display 121 indicates a list 122 with the different available category-labels ("General", "ToDo", "Private", "Urgent" and "Draft", etc.). This display also includes the two labels 35 indicating the present functionality, (Options: A selection menu will appear with different options; Back: jump back to the previous menu level) of the two soft keys 8. The user of the phone uses the navigation keys 10 to scroll up or down in the list 122. By pressing the right "Back" soft key 8 it returns to the previous display 120, step 276. In display 120 the "Settings" function could be started again or one of the other functions, "Record", "Sorting" or "Playback" can be displayed, and later started, by scrolling up and down in this display with the navigation keys 10.

In the list 122 a category-label 123 is highlighted to indicate, which category-label will be selected by pressing the left "Options" soft key 8. When the left "Options" soft key 8 is pressed, a display 124 will appear showing a list 125, step 252, with different options ("Add entry", "Add voice tag", "Set as default", "Rename" and "Erase") to handle the selected category-label or execute other settings. Naturally, there could be other options than those in the list 125, like "Set default priority", "Playback voice tag" or "Set voice commands". This embodiment is however only exemplified with the options present in list 125. The user of the phone uses the navigation keys 10 to scroll up or down in the list 125 in order to select the required option or feature.

When the feature 126, "Add entry", is selected, step 253, the processor 18 will check if there is available memory space for a new entry, step 258, i.e. a new category-label. As a rule there could be some category-labels defined by the operator or by the phone manufacturer that cannot be changed, e.g. "General", "ToDo", "Private", "Urgent" and "Draft", and some other free category-labels that are to be defined by the user of the phone. There is no limit for how many category-labels that could be added, but a suitable number of category-labels could be between five and ten. In this embodiment there will be five manufacturer-defined category-labels used and up to five free category-labels to be defined by the phone user.

If the processor 18 finds out that the memory is full and there is no free category-label, step 259, display 131 will appear with a header 132, "The memory is full. Do you want to rename a category-label?". It also shows the two labels 35, which indicates the present functionality (Yes: Rename one of the user-defined category-labels; No: jump back to display 124) of the two soft keys 8. By pressing the right "No" soft key 8 the phone jumps to display 133 indicating a list 134 with the present user-defined category-labels, step 261. Since the user decided not to rename another category-label, when the memory was full and no new category-labels are available, one of the old ones needs to be erased.

In the list 134 a category-label 135 is highlighted to indicate, which category-label will be erased by pressing the left "Erase" soft key 8, step 262. If the left "Erase" soft key 8 is pressed a display 136 will appear indicating with a header 137 "Do you want to transfer the memos assigned with the erased category-label?", step 264. Any voice tag connected to that category-label is automatically erased, step 263. The display 136 also includes the two labels 35, which indicates the present functionality (Yes: A list of all remaining category-labels appears; No: All memos with that category-label are erased.) of the two soft keys 8. By pressing the right "No" soft key 8 all memos with the category-label selected in display 133 are erased whereafter the phone jumps to the display 138, step 267. If the left "Yes" soft key 8 are pressed a display 141 will appear with a list 142 of all remaining category-labels, step 265.

By scrolling up and down the list 142 with the navigation keys 10 it is possible to select, step 266, which category-label should be attached to the memos that have no category-label. This due to that the one category-label that previously has been attached to the memos has been erased in order to make space for a new category-label. In display 141 is also indicated with label 35 the present functionality of the soft key 8. "Select" will assign the highlighted category-label 143 to the memos and thereafter will display 138 appear, and "Back" will bring the phone to the previous display 136.

The display 138 includes a header 139 "Enter name:" and a text field 140 into which letters may be entered by the alphanumeric keys 13. The label 35 indicates the present functionality (OK: Finished entering the name, continue to next menu; Erase: Erase the last entered letter; Back: the phone jumps back to the previous display) of the two soft keys 8. A cursor 144 in the text field 140 indicates the position of the next letter to be entered. The navigation keys 10 control the position of the cursor 144. When pressing the right "Erase" soft key 8 the last entered letter in the text field 140 will be erased or if the cursor 144 is placed in any other place the letter placed left of the cursor 144 will be erased. If no letters have been entered in the text field 140 the right label 35 indicates "Back" instead of "Erase",and the phone jumps back to display 124 if the right "Back" soft key 8 is pressed. By pressing the left "OK" soft key 8 the category-label will be named, step 274, that is entered in the text field 140. Thereafter display 145 will appear including a header 146, "Record Voice Tag", and label 35 indicating present functionality of the two soft key 8. "Start" will start recording a voice tag, step 275 that will be attached to the category-label entered in display 138. After recording the voice tag the setting feature stops and the phone jumps to display 120, step 276.

If the processor 18 after having selected "Add category-label" in display 124, step 253, finds out that there is a free category-label, step 258, display 138 will appear, which includes a header 139, "Enter name:", and a text field 140 into which letters may be entered by the alphanumeric keys 13. The label 35 indicates the present functionality of the two soft keys 8. A cursor 144 in the text field 140 indicates the position of the next letter to be entered. The navigation keys 10 control the position of the cursor 144. When pressing the right "Erase" soft key 8 the last entered letter in the text field 140 will be erased or if the cursor 144 is placed in any other place the letter placed to the left of the cursor 144 will be erased. If no letters have been entered in the text field 140 the right label 35 indicates "Back" instead of "Erase", and the phone jumps back to display 124 if the right "Back" soft key 8 is pressed. By pressing the left "OK" soft key 8 the category-label will be named, step 274, that is entered in the text field 140. Thereafter will display 145 appear including a header 146, "Record Voice Tag", and label 35 indicating present functionality of the two soft key 8. "Start" will start recording a voice tag, step 275, which will be attached to the category-label entered in display 138. After recording the voice tag the setting feature stops and the phone jumps to display 120, step 276.

If the left "Yes" soft key 8 is pressed in display 131, step 277, (The user wants to rename an already existing category-label) a display 147 will appear with a list 148 including all the user-defined category-labels, step 268. It also includes the two labels 35, which indicates the present functionality of the two soft keys 8 in display 147. By pressing the right "Back" soft key 8 the phone jumps back to the display 131. If the left "Select" soft key 8 is pressed the phone selects the highlighted user-defined category-label 149 to be renamed. After the category-label to be renamed has been selected, step 269, display 136 will appear, step 270. The display 136 indicates with a header 137 "Do you want to transfer the memos assigned with the erased category-label?", step 270. Any voice tag attached to that category-label is automatically erased, step 263. The display 136 also includes the two labels 35, which indicates the present functionality (Yes: A list of all remaining category-labels appears; No: All memos with that category-label are erased.) of the two soft keys 8. By pressing the right "No" soft key 8 all memos with the category-label selected in display 133 are erased, step 271, whereafter the phone jumps to the display 138, step 274. If the left "Yes" soft key 8 is pressed a display 141 will appear with a list 142 of all remaining category-labels, step 272.

By scrolling up and down the list 142 with the navigation keys 10 is possible to select, step 273, which category-label should be attached to the memos that have no category-label. This due to that the one category-label that has previously been attached to the memos is going to be renamed. In display 141 is also indicated with label 35 the present functionality of the soft key 8. "Select" will assign the highlighted category-label 143 to the memos and thereafter display 138 will appear, step 274, and "Back" will bring the phone to the previous display 136.

The display 138 includes a header 139 "Enter name:" and a text field 140 into which letters may be entered using the alphanumeric keys 13. The label 35 indicates the present functionality (OK: Finished entering the name, continue to next menu; Back/Erase: Erase the last entered letter or if no letters have been entered jumps back to a previous display) of the two soft keys 8. A cursor 144 in the text field 140 indicates the position of the next letter to be entered. The navigation keys 10 control the position of the cursor 144. When pressing the right "Erase" soft key 8 the last entered letter in the text field 140 will be erased or if the cursor 144 is placed in any other place the letter placed left of the cursor 144 will be erased. If no letters have been entered in the text field 140 the right label 35 indicates "Back" instead of "Erase",and the phone jumps back to display 147 if the right "Back" soft key 8 is pressed. By pressing the left "OK" soft key 8 the category-label will be named, step 274, that is entered in the text field 140. Thereafter display 145 will appear including a header 146, "Record Voice Tag", and label 35 indicating present functionality of the two soft key 8. "Start" will start recording a voice tag, step 275 that will be attached to the category-label entered in display 138. After recording the voice tag the setting feature stops and the phone jumps to display 120, step 276.

If the feature 127, "Add voice tag", is selected in display 124, step 254, the processor 18 will prepare recording a voice tag. Display 145 will appear including a header 146, "Record Voice Tag", and label 35 indicating present functionality of the two soft key 8. "Start" will start recording a voice tag, step 261 that will be attached to the category-label entered in display 138, and simultaneously an electronic representation of the voice tag will be created actually is that attached to the category-label entered in display 138. After recording the voice tag the setting feature stops and the phone jumps to display 120, step 276.

If the feature 128, "Set as default", is selected in display, step 255, the processor 18 will prepare to store a category-label that will be the default category-label. This means the category-label that will be assigned to the memo if the right "No" soft key is pressed in display 56, step 209. It is the category-label 123 selected in display 121, step 251, prior to the selection of the options in display 124 that is selected to be the default category-label. After the phone has saved category-label 123 as default category-label the phone returns to display 120, step 276.

If a free category-label should be selected as default category-label, and later be erased one of the pre-defined category-labels, e.g. "General" will automatically be selected as default category-label. The same goes if no category has been selected, when a pre-defined category-label, e.g. "General", acts as default category-label.

If the feature 129, "Rename", is selected in display 124, step 256, display 152 will appear indicating a list 153 with the present user-defined category-labels, step 268. The display also includes the two labels 35 indicating the present functionality of the two soft keys 8. If the right "Back" soft key 8 is pressed the phone will jump back to display 124. If the left "Rename" soft key 8 is pressed the highlighted category-label 154 is selected to be renamed, step 269. The highlighted category-label 154 could be selected from the list 153 by scrolling up and down the list 153 with the navigation keys 10.

After the category-label to be renamed has been selected, step 269, display 136 will appear, step 270. The display 136 indicates with a header 137 "Do you want to transfer the memos assigned with the erased category-label?", step 270. Any voice tag attached to that category-label is automatically erased, step 263. The display 136 also includes the two labels 35, which indicates the present functionality (Yes: A list of all remaining category-labels appears; No: All memos with that category-label are erased.) of the two soft keys 8. By pressing the right "No" soft key 8 all memos with the category-label selected in display 152 are erased, step 271, whereafter the phone jumps to the display 138, step 274. If the left "Yes" soft key 8 is pressed a display 157 will appear with a list 158 of all remaining category-labels, step 272.

By scrolling up and down the list 142 with the navigation keys 10 is possible to select, step 273, which category-label should be attached to the memos that have no category-label. This due to that the one category-label that previously has been attached to the memos is going to be renamed. In display 157 is also indicated with label 35 the present functionality of the soft key 8. "Select" will assign the highlighted category-label 159 to the memos and thereafter will display 138 appear, step 274, and "Back" will bring the phone to the previous display 136.

The display 138 includes a header 139 "Enter name:" and a text field 140 into which letters may be entered using the alphanumeric keys 13. The label 35 indicates the present functionality of the two soft keys 8. A cursor 144 in the text field 140 indicates the position of the next letter to be entered. The navigation keys 10 control the position of the cursor 144. When pressing the right "Erase" soft key 8 the last entered letter in the text field 140 will be erased or if the cursor 144 is placed in any other place the letter placed to the left of the cursor 144 will be erased. If no letters have been entered in the text field 140 the right label 35 indicates "Back" instead of "Erase", and the phone jumps back to display 152 if the right "Back" soft key 8 is pressed. By pressing the left "OK" soft key 8 the category-label will be renamed, step 274, to that entered in the text field 140. Thereafter display 145 will appear including a header 146, "Record Voice Tag", and label 35 indicating present functionality of the two soft key 8. "Start" will start recording a voice tag, step 275 that will be attached to the category-label entered in display 138. If the right "Back" soft key 8 is pressed the phone will jump back to display 138 to enable entering of a new name of the category-label. Any voice tag attached to previous category-label is automatically erased. After that the setting feature stops and the phone jumps to display 120, step 276.

The displays 121, 141 and 157 appear to be of another size compared with previous shown displays, but this is not the case. However the lists 122, 142 and 158 of category-labels and memos could be longer than the available space in displays. To enhance the understanding are displays 121, 141 and 157 are shown here including the whole lists 122, 142 and 158, and thereby the displays 121, 141 and 157 are not the actual size.

When the feature 130, "erase", is selected in display, step 257, display 133 will appear, step 261, indicating a list 134 with the present user-defined category-labels. The display also includes the two labels 35 indicating the present functionality of the two soft keys 8. If the right "Back" soft key 8 is pressed the phone will jump back to display 124. If the left "Erase" soft key 8 is pressed the highlighted category-label 135 will be erased, step 262. The highlighted category-label 135 could be selected from the list 134 by scrolling up and down the list 134 with the navigation keys 10. Any voice tag attached to that category-label is automatically erased, step 263.

If the left "Erase" soft key 8 is pressed a display 136 will appear indicating with a header 137 "Do you want to transfer the memos assigned with the erased category-label?", step 264. The display 136 also includes the two labels 35, which indicates the present functionality (Yes: A list of all remaining category-labels appears; No: All memos assigned with that category-label are erased.) of the two soft keys 8. By pressing the right "No" soft key 8 all memos with the category-label selected in display 133 are erased whereafter the settings function ends and the phone jumps to the display 120, step 276.

If the left "Yes" soft key 8 is pressed a display 141 will appear with a list 142 of all remaining category-labels, step 265. By scrolling up and down the list 142 with the navigation keys 10 it is possible to select, step 266, which category-label should be attached to the memos that have no category-label. In display 141 is also indicated with label 35 the present functionality of the soft key 8. If the left "Select" soft key 8 is pressed, the highlighted category-label 143 will be assigned, step 266, to the memos whereafter the settings function ends and the phone jumps to the display 120, step 276. If the right "Back" soft key 8 is pressed the phone will jump back to display 136.

Figure 8:
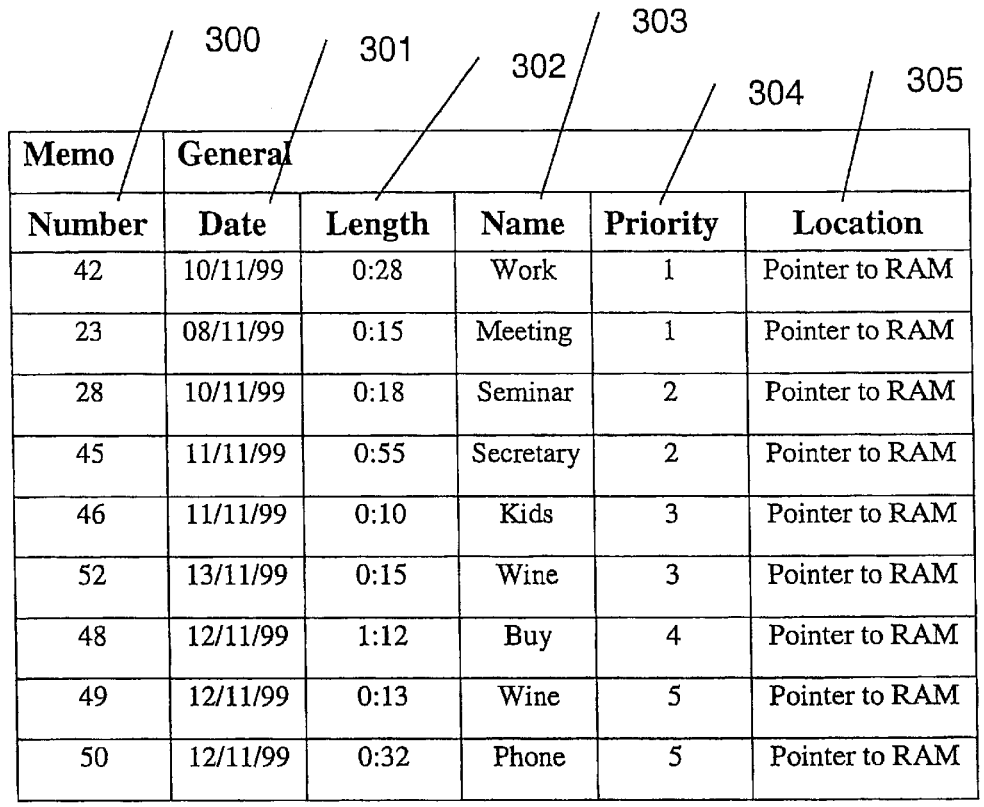
FIG. 8 illustrates the basic structure of the list of memos listed on the display sorted after priority and date.

The voice memos are principally stored as generated electronic representations in a RAM as shown in FIG. 8, where each stored unit includes an identifying code 300, a date of recording 301, length of recording 302, name of the memo 303, priority 304, and a pointer 305 to where in the memory the data has been stored. When sorting the memo only the pointer information will be changed. The same principle is valid for the storing of the category-labels and their voice tags. Another way of viewing the memory structure is to see it as a hierarchic structure, where the category-labels are main levels and the voice memos are organised under the category-label to which they have been assigned.

The invention is not limited to the above described or to the drawings showing examples of an embodiment, but can be varied within the scope of the appended claims.

What is claimed is:

1. A method for handling recorded acoustic samples in a mobile phone represented in categories in a hierarchical memory structure comprising:
   recording an acoustic sample and generating an electronic representation of said acoustic sample in said memory structure, said electronic representation of said acoustic sample being retrievable from said memory structure and played back, assigning a label of each electronic representation of said acoustic sample, said label includes a category in said memory structure and a name for said electronic representation of said acoustic sample, said assigning including:
    assigning each electronic representation of said acoustic sample a default or user-defined category in said memory structure,
    assigning a name for said electronic representation of said acoustic sample,
    assigning a sorting criteria, and
    assigning date, time and duration of record to the electronic representation of said acoustic sample,
displaying the name of said electronic representation of said acoustic sample under the assigned category in said memory structure, the displaying including an indication whether said acoustic sample has been played back or not, and
playing back said electronic representation of said acoustic sample from a selected category in said memory structure
wherein the mobile phone is compatible for use in a GSM network.

2. A method for handling recorded acoustic samples according to claim 1, wherein said acoustic sample includes voice memos.

3. A method for handling recorded acoustic samples according to claim 1, wherein the displaying of the electronic representation of said acoustic sample in said memory structure includes a hierarchy of said categories names enable retrieval of electronic representation assigned with a certain category label.

4. A method for handling recorded acoustic samples according to claim 1, wherein said electronic representation of said acoustic sample is assigned a label including a category in said memory structure and a name for said electronic representation of said acoustic sample, coincident with said recording of said acoustic sample and generation of an electronic representation of said acoustic sample.

5. A method for handling recorded acoustic samples according to claim 1, wherein said sorting criteria comprises at least one of a date and a priority.

6. A method for handling recorded acoustic samples according to claim 1, wherein said electronic representation of said acoustic sample assigned to one label or category-label can be transferred to another label or category-label in the memory structure, renamed or deleted, and that a label or category-label can be added to the memory structure, renamed or deleted.

7. A method for handling recorded acoustic samples according to claim 6, wherein said label or category-label can be a default label or category-label or user-defined label or category-label.

8. A method for handling recorded acoustic samples according to claim 1, wherein displaying of the electronic representations assigned to one label or category-label can be altered by changing sorting criteria of the electronic representations, change of the name of the electronic representations, deleting some of the electronic representations or transferring electronic representations to another label or category-label in the memory structure.

9. A memory management terminal comprising a mobile phone for handling recorded acoustic samples represented in categories in a hierarchical memory structure comprising:
    recording means for recording an acoustic sample and generating an electronic representation of said acoustic sample in said memory structure, said electronic representation of said acoustic sample being retrievable from said memory structure and played back,
    inputting means for assigning a label of each electronic representation of said acoustic sample, said label includes a category in said memory structure and a name for said electronic representation of said acoustic sample, wherein said assigning of a label to each electronic representation of said acoustic sample includes:
        assigning each electronic representation of said acoustic sample a default or user-defined category in said memory structure,
        assigning a name for said electronic representation of said acoustic sample,
        assigning a sorting criteria, and
        assigning date, time and duration of record to the electronic representation of said acoustic sample, and
    outputting means for displaying the name of said electronic representation of said acoustic sample under the assigned category in said memory structure and said electronic representation of said acoustic sample, and an indication whether said acoustic sample has been played back or not
    wherein the mobile phone is compatible for use in a GSM network.

10. A memory management terminal for handling recorded acoustic samples according to claim 9, wherein said handled acoustic sample includes voice memos.

11. A memory management terminal for handling recorded acoustic samples according to claim 9, wherein said electronic representation could be a MIDI-file or any similar file-type for electronic representation of an acoustic sample.

12. A memory management terminal for handling recorded acoustic samples according to claim 11, wherein inputting means includes that said electronic representation is assigned a category in said memory structure and a name for said electronic representation of said acoustic sample, coincident with said recording of said acoustic sample and generation of an electronic representation of said acoustic sample.

13. A memory management terminal for handling recorded acoustic samples according to claim 9, wherein the outputting means for representing the name of said electronic representation of said acoustic sample under the assigned category in said memory structure and representing said electronic representation of said acoustic sample includes displaying said name of said electronic representation in a display of said memory management terminal and playback the electronic representation of said acoustic sample.

14. A memory management terminal for handling recorded acoustic samples according to claim 12, wherein the outputting means includes said electronic representation of said acoustic sample assigned to one label or category-label can be transferred to another label or category-label in the memory structure, renamed or deleted, and that a label or category-label can be added to the memory structure, renamed or deleted, and that said label or category-label can be a default label or category-label or user-defined label, and that the displaying of the electronic representations assigned to one label or category-label can be altered by changing sorting criteria of the electronic representations, change of the name of the electronic representations, deleting some of the electronic representations or transferring electronic representations to another label or category-label in the memory structure.

* * * * *